US012091065B2

(12) United States Patent
Dyavanapalli

(10) Patent No.: US 12,091,065 B2
(45) Date of Patent: Sep. 17, 2024

(54) DEVICE AND RELATED METHODS FOR RAIL LUBRICANT STORAGE

(71) Applicant: Loram Maintenance of Way, Inc., Hamel, MN (US)

(72) Inventor: Venkat Dyavanapalli, Glendale, IL (US)

(73) Assignee: LORAM MAINTENANCE OF WAY, INC., Hamel, MN (US)

( * ) Notice: Subject to any disclaimer, the term of this patent is extended or adjusted under 35 U.S.C. 154(b) by 1030 days.

(21) Appl. No.: 16/037,535

(22) Filed: Jul. 17, 2018

(65) Prior Publication Data

US 2019/0016355 A1 Jan. 17, 2019

Related U.S. Application Data

(60) Provisional application No. 62/533,452, filed on Jul. 17, 2017.

(51) Int. Cl.
*B61K 3/02* (2006.01)
*B61F 17/30* (2006.01)
(Continued)

(52) U.S. Cl.
CPC ............. *B61K 3/02* (2013.01); *B61F 17/30* (2013.01); *B61K 3/00* (2013.01); *B65D 90/041* (2013.01);
(Continued)

(58) Field of Classification Search
CPC ... B61K 3/00; B61K 3/02; B61F 12/30; B61F 17/30; B61F 17/26; F16N 19/00;
(Continued)

(56) References Cited

U.S. PATENT DOCUMENTS 3,159,306 A * 12/1964 Lyall ...................... E03B 11/00
220/565
3,623,629 A * 11/1971 Hendershot .......... B65D 90/046
220/661

(Continued)

FOREIGN PATENT DOCUMENTS

WO WO 2014/076315 A2 5/2014

OTHER PUBLICATIONS

PCT International Preliminary Report on Patentability and Written Opinion for International Application No. PCT/US2018/042394, dated Jan. 21, 2020, 8 pages.

(Continued)

*Primary Examiner* — Minh Truong
(74) *Attorney, Agent, or Firm* — Patterson, Thuente IP

(57) ABSTRACT

A disposable lubrication tank liner for a rail lubricating system, including an upper sidewall portion, a lower outlet portion, and an intermediate edge surface. The upper sidewall portion has a plurality of generally vertically disposed walls extending downwardly from an upper flange surface. The vertically disposed walls partially define a reservoir space for holding rail lubricant. The lower outlet portion includes a plurality of angled wall portions converging inwardly to a lower flange surface to further define the reservoir space. Further, the intermediate edge surface connects the upper sidewall portion and the lower outlet portion.

23 Claims, 4 Drawing Sheets

(51) Int. Cl.
*B61K 3/00* (2006.01)
*B65D 90/04* (2006.01)
*F16N 19/00* (2006.01)
*F16N 29/02* (2006.01)
*B61F 17/26* (2006.01)

(52) U.S. Cl.
CPC ............. *F16N 19/00* (2013.01); *F16N 29/02* (2013.01); *B61F 17/26* (2013.01)

(58) Field of Classification Search
CPC ....... F16N 28/02; F16N 29/02; B65D 90/046; B65D 88/046; B65D 90/041; B65D 90/042; B65D 90/043; B65D 90/044; B65D 90/045; E03B 11/00; B21D 19/04; F17C 1/16
See application file for complete search history.

(56) References Cited

U.S. PATENT DOCUMENTS

| | | | | |
|---|---|---|---|---|
| 3,765,211 A | * | 10/1973 | Struss | B21D 19/04 |
| | | | | 72/214 |
| 3,874,544 A | * | 4/1975 | Harmon | F17C 1/16 |
| | | | | 220/590 |
| 4,856,617 A | | 8/1989 | Lounsberry | |
| D320,442 S | * | 10/1991 | McKay | D23/206 |
| 5,282,550 A | * | 2/1994 | Coleman | B65D 90/041 |
| | | | | 222/105 |
| D376,196 S | * | 12/1996 | Segel | D23/313 |
| 5,836,363 A | * | 11/1998 | LaFleur | B65D 90/046 |
| | | | | 141/314 |
| 2004/0194846 A1 | * | 10/2004 | Sone | B32B 15/04 |
| | | | | 141/65 |
| 2006/0163004 A1 | | 7/2006 | Kumar | |
| 2010/0181327 A1 | | 7/2010 | Kanda | |
| 2010/0224449 A1 | | 9/2010 | Singleton et al. | |
| 2013/0001224 A1 | * | 1/2013 | Payne | B65D 88/546 |
| | | | | 220/4.17 |
| 2014/0097182 A1 | * | 4/2014 | Sheesley | B65D 90/587 |
| | | | | 29/401.1 |

OTHER PUBLICATIONS

Trelleborg.com, "Nyton", Mar. 25, 2016, http://www.trelleborg-lifesciences.com/en/materials/plastics/nylon/nylon.html, 1 page.

\* cited by examiner

DEVICE AND RELATED METHODS FOR RAIL LUBRICANT STORAGE

RELATED APPLICATION

The present application claims the benefit of U.S. Provisional Application No. 62/533,452, filed Jul. 17, 2017, which is hereby incorporated herein in its entirety by reference.

FIELD OF THE INVENTION

The present invention is generally directed to the field of rail lubrication. More, specifically, the present invention is directed to a replaceable tank liner for efficiently switching out rail lubrication grease.

BACKGROUND OF THE INVENTION

An inherent challenge with railway operation is the amount of friction that exists between wheels on rail cars and a rail surface. Depending upon railway location, for example, a hump yard or on curved sections of rail, excessive friction can lead to premature slowing or stopping of the rail car while also leading to excessive wear on the rails. A common approach to reducing friction at certain high-friction locations is to continuously apply a grease or similar style lubricant to the rail.

Conventional rail lubricant systems can use nozzles to spray the rail lubricant onto a desired rail surface or can use lubrication bars to position lubricant for contact by passing wheels. Regardless of the system design, the rail lubricant is generally contained in a storage tank located proximate to a desired lubrication area. As the rail lubricant is pumped from the storage tank to a lubricant applicator, the amount of rail lubricant in the storage tank will drop requiring periodic filling. In addition, certain seasonal changes, for example, temperature and precipitation changes (both amount and type), may require the use of seasonal lubricants based on lubricant properties such as, for example, viscosity. Adding and/or changing out rail lubricant from conventional storage tanks is extremely labor intensive, can require special cleaning equipment and result in excess costs associated with rail downtime, environmental disposal and clean-up costs as well as lubricant waste.

For at least these reasons, it would be advantageous to improve upon existing rail lubricant storage designs.

SUMMARY OF THE INVENTION

Embodiments of the present invention are generally directed to a replaceable tank liner that can be placed or dropped into and removed from a rail storage tank so as to refill the rail storage tank with rail lubricant or to change out a rail lubricant with a second rail lubricant having different properties.

Embodiments relate to a disposable lubrication tank liner for a rail lubricating system, including an upper sidewall portion, a lower outlet portion, and an intermediate edge surface. The upper sidewall portion has a plurality of generally vertically disposed walls extending downwardly from an upper flange surface. The vertically disposed walls partially define a reservoir space for holding rail lubricant. The lower outlet portion includes a plurality of angled wall portions converging inwardly to a lower flange surface to further define the reservoir space. Further, the intermediate edge surface connects the upper sidewall portion and the lower outlet portion.

Embodiments relate to a lubrication tank liner, including a corrosion-resistant body that covers an interior reservoir of a lubrication tank of a rail lubrication system. The lubrication tank liner has vertical walls of rectangular dimensions and angled wall portions of trapezoidal dimensions integrally formed and contoured for conforming engagement with the interior reservoir.

Embodiments further relate to a method of maintaining a lubrication tank of a rail lubricating system. The method includes providing a lubrication tank including an interior reservoir and opening the lubrication tank to expose the interior reservoir. The method further includes placing a lubrication tank liner within the interior reservoir. The lubrication tank liner is shaped to generally match to the interior reservoir and includes an upper sidewall portion and a lower outlet portion including a plurality of angled wall portions converging inwardly. The method includes securing the lubrication tank liner to the lubrication reservoir with a plurality of fasteners and filling the lubrication tank liner with lubrication fluid. Further, the method includes pumping lubrication fluid from the lubrication tank to a lubricant applicator for a railway and removing the lubrication tank liner for disposal.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
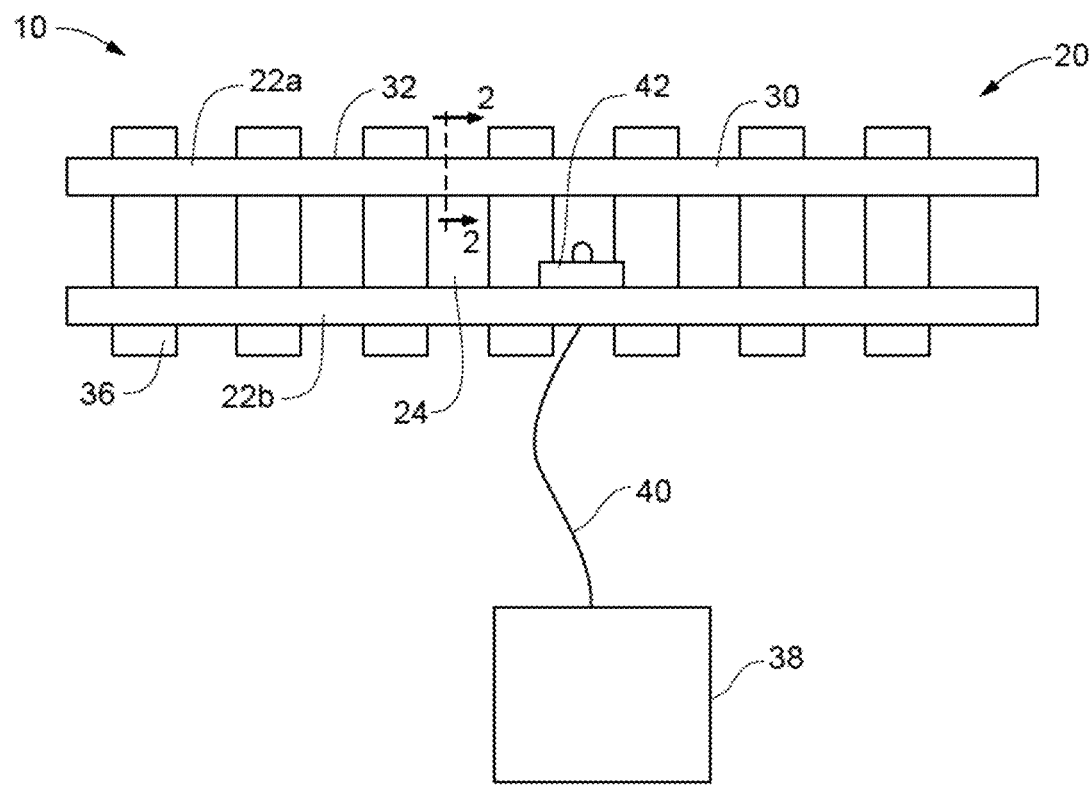
FIG. 1 is a top view of a prior art railway having a rail lubricating system.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Figure 2:
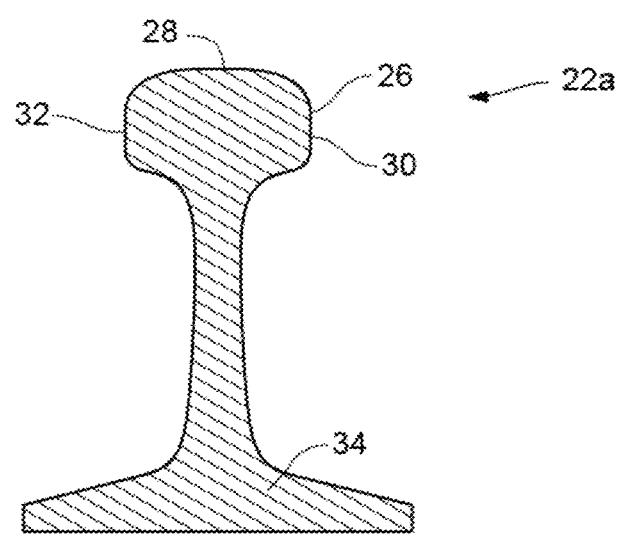
FIG. 2 is a section view of a prior art rail member from FIG. 1 at section 2-2.

The lubrication tank liner 100 and related apparatus, components, methods, and systems disclosed can be understood from the following embodiments and environments described. In general, FIGS. 1 and 2 depict prior art embodiments of a rail lubrication system 10. Specifically, FIG. 1 shows a top view of a railway 20 and FIG. 2 shows a cross sectional view of a rail member 22a at section 2-2 of FIG. 1.

As shown, railway 20 generally comprises a pair of rail members 22a and 22b that lie on a railbed 24 in a parallel relationship with one another. Each rail member 22a and 22b generally has a rail profile 26 that includes a crown 28 upon which a rail wheel rotates. Rail profile 26 further defines a gauge-face 30 and a field face 32, with the gauge-face 30 facing internally toward an opposed rail member and the field face 32 facing externally, away from the railbed 24. Each rail member 22a and 22b includes a rail base 34 that is used to secure the rail members 22a and 22b to the supporting rail ties 36 on the railbed 24.

In high friction locations such as, for example, at curves and switching/hump yards, a rail lubrication system 10 can be utilized to apply a lubricant to the rail members 22a and 22b so as to reduce friction and extend service life. Typically, the rail lubrication system 10 includes a remote lubrication supply 38, a lubricant supply hose 40 and a lubricant applicator 42 as shown in FIG. 1. The remote lubrication supply 38 can include a lubricant reservoir, a control system and a pump system. In some cases, the remote lubrication supply 38 will comprise a lubrication tank. At the direction of the remote lubrication supply 38, lubricant is pumped through the lubricant supply hose 40 and to the lubricant applicator 42, whereby the lubricant is applied to the rail. In some instances, the rail lubrication supply 38 can be configured as a top-of-rail lubrication system in which lubricant is applied to the crown 28. With top-of-rail lubrication systems, the lubricant applicator 42 is generally positioned in proximity to the field face 32. Alternatively, lubricant can be applied to the gauge-face 30 so as to provide lubrication to passing wheel flanges.

Figure 3:
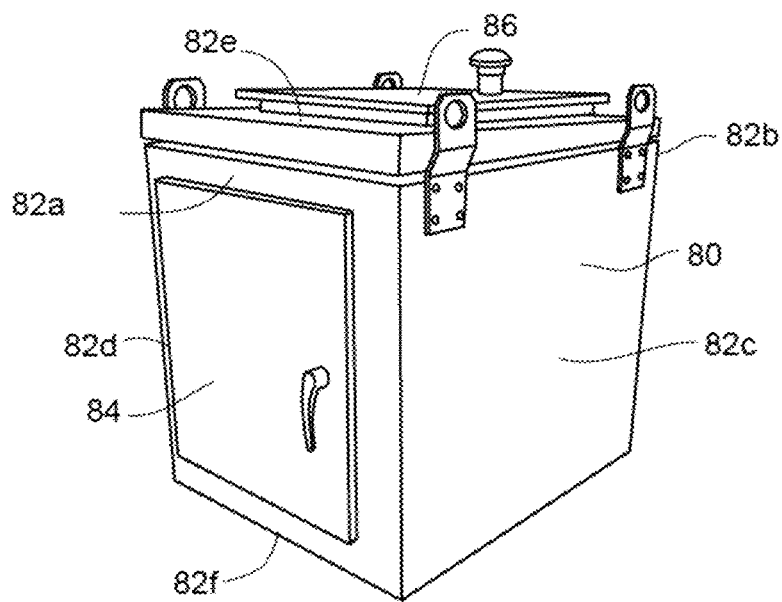
FIG. 3 is a lubrication tank, according to an embodiment.

FIG. 3 shows an embodiment of a lubrication tank 80. This lubrication tank 80 may serve as the lubrication supply 38, for a system like the rail lubricating system 10 described above. The lubrication tank 80 can be freestanding or otherwise contained as part of a lubrication assembly. The lubrication tank 80 is generally made of metal or other suitable rigid and robust material. Contained within the lubrication tank 80 is a lubrication reservoir (not shown). The lubrication reservoir can comprise a container of various shapes and dimensions. Generally, the lubrication reservoir will have an opening in the top of the reservoir into which fluid can be loaded, for example.

In various embodiments, the lubrication tank 80 generally has outside dimensions of roughly a rectangular prism or cube. The lubrication tank 80, as shown in FIG. 3, generally includes six outer wall panels, collectively referred to as wall panels 82 herein. Specifically, these wall panels 82 include a front wall panel 82a, rear wall panel 82b, side wall panels 82c and 82d, top wall panel 82e, and bottom wall panel 82f. Lubrication tank 80 can alternatively include other shapes or forms for a storage container and is not limited to the shape depicted in the FIGS. Front wall panel 82a is shown with a hinged access door 84 and top wall panel 82e is shown with a pivoting or removable access door 86 as well.

Figure 4:
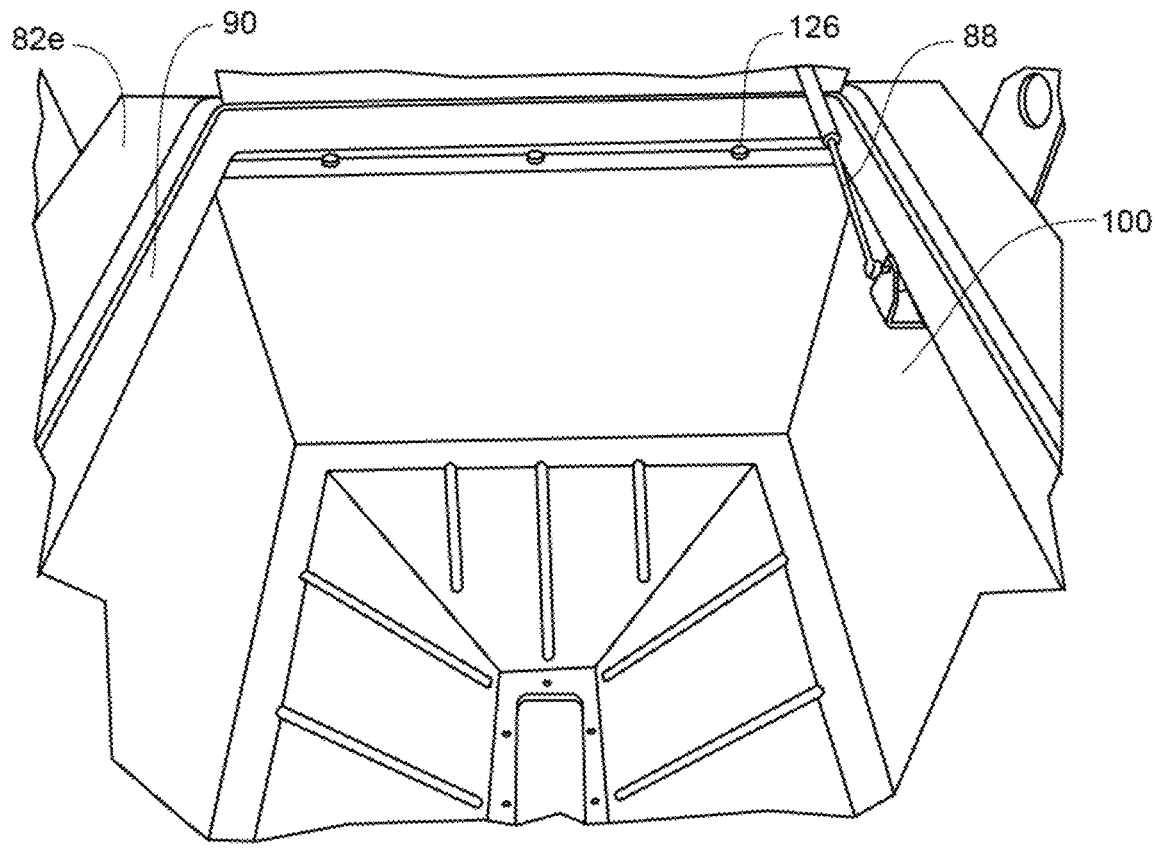
FIG. 4 is an interior view of a lubrication tank having a tank liner, according to an embodiment.
Figure 5:
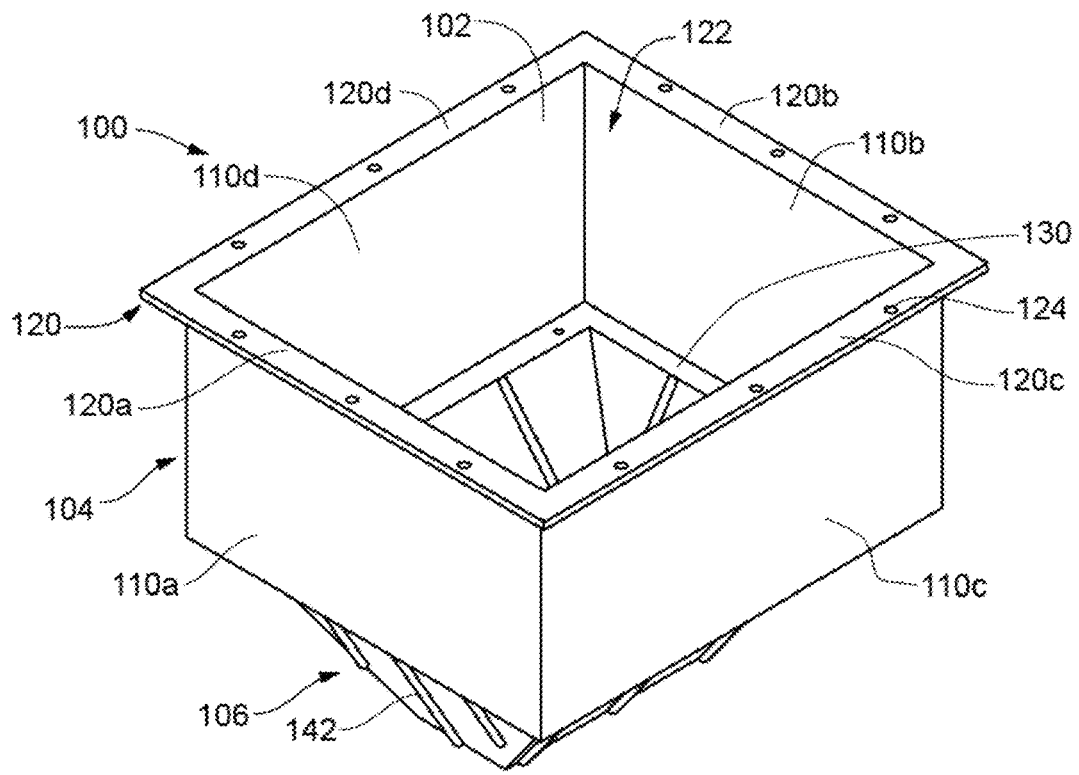
FIG. 5 is a top perspective view of a tank liner, according to an embodiment.
Figure 6:
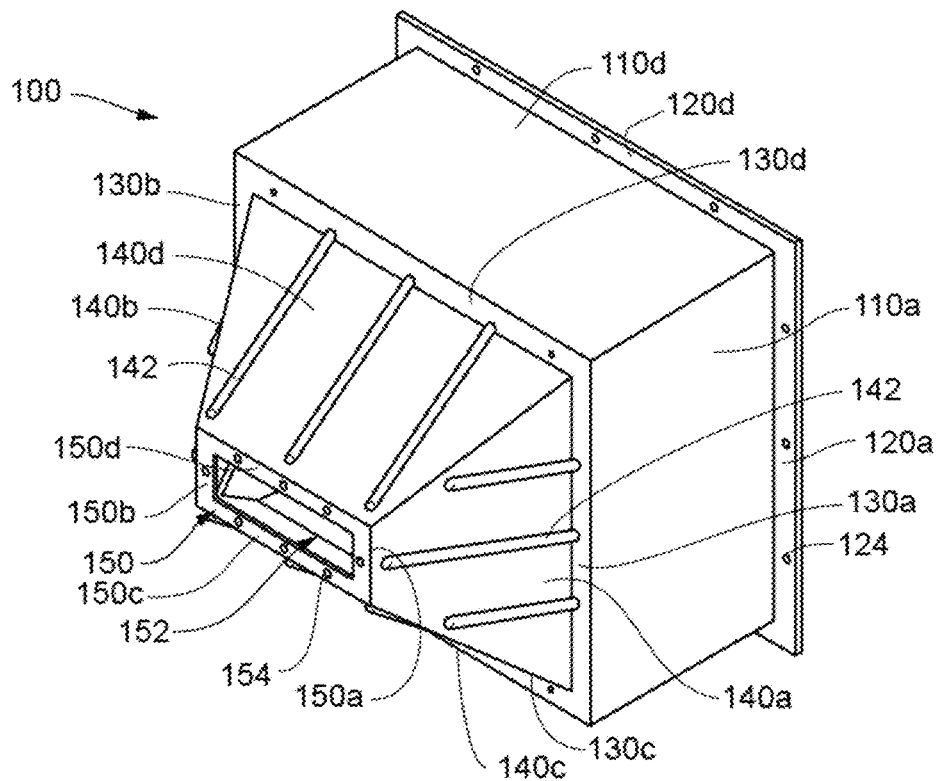
FIG. 6 is a bottom perspective view of a tank liner, according to an embodiment.
Figure 7:
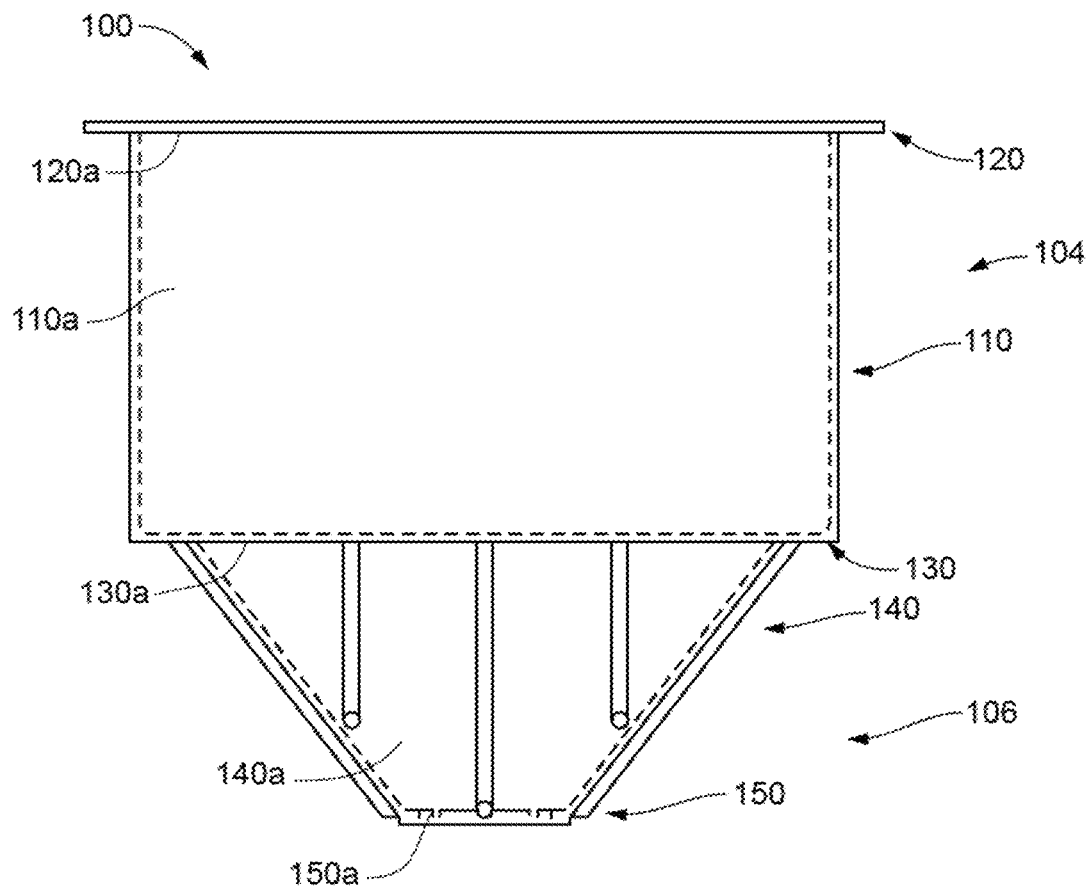
FIG. 7 is a side view of a tank liner, according to an embodiment.

In some embodiments, the access door 84 can provide access to an internally-located, control system and/or pump system of the remote lubrication supply 38. In some embodiments, a lubricant reservoir can be accessed from an opened access door 86 or an opened or removed top wall panel 82e of the lubrication tank 80. In other embodiments, the lubrication reservoir could be accessed from an access door 84 located in a front or side wall panel. FIG. 4 generally depicts an embodiment with an open access door 86 in the top wall panel 82e. Access door 86 is propped open via a hydraulic cylinder 88 at one side of the opening 90 in the top wall panel 82e. A lubrication tank liner 100 is shown internally within the lubrication reservoir of the lubrication tank 80. Tank liners 100 can protect lubrication tanks 80 from corrosion and provide for easy, efficient clean-up and reduced disposal costs compared to direct use of the reservoir. The tank liner 100 can be situated in the lubrication tank 80 by being dropped in or inserted from above, for example.

As shown in FIGS. 4-8, a representative embodiment of a lubrication tank liner 100 is shown. Lubrication tank liner 100 can comprise a liner body 102 that is molded or otherwise formed for placement in a lubrication tank 80. The lubrication tank liner 100 can be aligned and closely matched with internal reservoir structures within the lubrication tank 80. In some embodiments, the lubrication tank liner 100 can be loosely or rigidly coupled within the lubrication tank 80. The lubrication tank liner 100 can be fabricated of suitable materials including metals, plastics or chemically compatible polymers. In various embodiments, the thickness of the tank liner 100 can be 2 millimeters to 0.5 inches.

Generally, tank liner 100 can include an upper sidewall portion 104 and a lower outlet portion 106. Upper sidewall portion 104 can include a front wall 110a, a rear wall 110b and opposed sidewalls 110c, 110d. Upper sidewall portion 104 can further comprise an upper flange surface 120 providing a lip around the top of the tank liner 100. Upper flange surface 120 is defined by a front flange surface 120a, a rear flange surface 120b and a pair of opposed side flanges 120c, 120d. An upper liner opening 122 is defined between the front flange surface 120a, rear flange surface 120b and opposed side flanges 120c, 120d. Upper flange surface 120 contains a plurality of spaced-apart apertures 124 around its perimeter. These apertures 124 provide locations in which fasteners 126 can secure the tank liner 100 to the inside of the lubrication tank 80, as shown in FIG. 4.

Upper sidewall portion 104 contains walls 110a, 110b, 110c, and 110d (or generally, walls 110) which are generally vertically disposed and extend downwardly from upper flange surface 120 to an intermediate edge surface 130. The vertically disposed walls 110a, 110b, 110c, and 110d partially define the upper portion of a reservoir lining container for holding rail lubricant. The walls 110 are each generally rectangular in shape and dimensions. Intermediate edge surface 130 is shown as a short lip that is largely horizontally disposed and extends inwardly from the lower perimeter of the walls 110. Intermediate edge surface 130 provides an interior intermediate lip and transition between the upper sidewall portion 104 and the lower outlet portion 106. Intermediate edge surface 130 includes a front lip 130a, rear lip 130b, and side lips 130c and 130d.

Lower outlet portion 106 can include a plurality of inwardly angled wall portions 140a, 140b, 140c, and 140d (or generally, wall portions 140) converging inwardly from the intermediate edge surface 130 to a lower flange surface 150 to further define the reservoir space inside the liner. Inwardly angled wall portions 140 include a front angled wall portion 140a, a rear angled wall portion 140b and a pair of angled side wall portions 140c, 140d. Inwardly angled wall portions 140 are generally each trapezoidal in shape and dimensions. In some embodiments, inwardly angled wall portions 140 include spaced-apart, protruding, structural grooves 142 located along their lengths. These structural grooves 142 are integrally formed with the tank liner 100 in some embodiments. Structural grooves 142 can provide structural support for the strength and rigidity of the tank liner 100. Structural groove 142 can also provide support surfaces for resting the tank liner 100 on top of the internal reservoir features of the lubrication tank 80.

Lower outlet portion 106 can also comprise lower flange surface 150. Lower flange surface 150 is defined at a lowermost portion of the tank liner 100. The lower flange surface 150 can comprise a lower flange front surface 150*a*, a lower flange rear surface 150*b*, and a pair of lower flange side surfaces 150*c*, 150*d*. In embodiments, like FIG. 6, the lower flange surface 150 forms a generally rectangular shape. A lower liner opening 152 is defined between the lower flange front surface 150*a*, a lower flange rear surface 150*b* and lower flange side surfaces 150*c*, 150*d*. Rail lubricant can be drawn out from this opening 152 via pump components located either inside or outside the tank liner 100. Lower flange surface 150 contains a plurality of spaced-apart apertures 154 around its perimeter. These apertures 154 provide locations in which fasteners can secure the tank liner 100 to the inside of the lubrication tank 80. Alternatively, fasteners can attach to other structures that close the lower liner opening 152, when the tank liner 100 is being removed from the lubrication tank 80.

In operation, a lubrication tank of a rail lubricating system can be maintained according to various methods. In some cases, a lubrication tank 80 is first provided including an interior reservoir. The lubrication tank 80 is opened, typically from above, to expose the interior reservoir. Prior to use of a lubrication tank 80 in a rail lubrication system 10, a lubrication tank liner 100 is inserted and placed into the internal reservoir cavity of the lubrication tank 80. This can be done by inserting the tank liner 100 through an opening in the top or side of the lubrication tank 80. The upper side portion 104 and lower outlet portion 106 of the liner 100, accordingly, are each coupled against the internal structures of the interior reservoir of the lubrication tank 80, via matching features. Fasteners 126 may be used to further secure the tank liner 100 to the lubrication tank 80 via apertures 124 and/or 154 in the upper flange surface 120 and lower flange surface 150. Once the tank liner 100 is secured into place, the liner 100 within the tank 80 may be filled with rail lubricant.

Rail lubricant, accordingly, then can be pumped from the storage tank 80 to a lubricant applicator 42 located on a railway 20. Once the tank liner 100 is emptied of lubricant, a change of lubricant type is required, a liner replacement is desired, or other cleaning is needed, the tank liner 100 can be readily removed and replaced. Specifically, a user may simply access the inside of the lubrication tank 80, remove any fasters 126, and lift out or otherwise remove the lubrication tank liner 100. In some cases the liner 100 may have a hook-up mechanism that permits easy lifting as well. The current tank liner 100 can be easily stored or disposed of and a new tank liner 100 can be inserted and secured in the lubrication tank 80.

Accordingly, using lubrication tank liners 100 makes it possible to change out seasonal rail lubricant or grease grades in minutes. The lubrication tank liners 100 provide the ability to store excess lubrication fluid and grease. Further, clean-up efforts are greatly reduced in addition to reducing environmental disposal costs. Other potential advantages realized by lubrication tank liners 100 include increased efficiency and up-time of equipment and the ability of users to readily switch between gage face and top of rail lubrication systems.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A disposable lubrication tank liner for a rail lubricating system, comprising:
   an upper sidewall portion having a plurality of generally vertically disposed walls extending downwardly from an upper flange surface, the vertically disposed walls partially defining a reservoir space for holding rail lubricant, the upper flanged surface having a front flange surface, a rear flange surface and a pair of opposed side flange surfaces, the upper flanged surface defining a top lip surrounding an upper liner opening, the upper liner opening defined between the front flange surface, the rear flange surface and the pair of opposed side flange surfaces;
   a lower outlet portion including a plurality of angled wall portions converging inwardly to a lower flange surface to further define the reservoir space; and
   an intermediate edge surface connecting the upper sidewall portion and the lower outlet portion, wherein the upper side wall portion, lower outlet portion and intermediate edge are rigidly formed and align with and match an internal reservoir structure defined within a lubrication tank as the disposable lubrication tank liner is inserted into the lubrication tank; and wherein the top lip is adapted to engage an upper opening of the lubrication tank.

2. The disposable lubrication tank liner of claim 1, wherein the tank liner is made of metal, plastic or polymer materials.

3. The disposable lubrication tank liner of claim 1, wherein the tank liner has a thickness of 2 millimeters to 0.5 inches.

4. The disposable lubrication tank liner of claim 1, further including a hook-up mechanism that aids in lifting the tank liner.

5. The disposable lubrication tank liner of claim 1, wherein the tank liner is corrosion-resistant.

6. The disposable lubrication tank liner of claim 1, wherein the plurality of angled wall portions contain one or more grooved ribs that conform the tank liner to an inner surface of the lubrication tank.

7. The disposable lubrication tank liner of claim 1, wherein the upper sidewall portion, the lower sidewall portion, and the intermediate edge surface are integrally formed and contoured for matching engagement with an interior reservoir structure of the lubrication tank.

8. The disposable lubrication tank liner of claim 1, wherein the upper flanged surface includes a plurality of apertures for operably coupling the upper flanged surface to the lubrication tank.

9. The disposable lubrication tank liner of claim 1, wherein the lower flange surface includes a plurality of apertures for operably coupling the lower flanged surface to the lubrication tank.

10. A lubrication tank liner, comprising a corrosion-resistant liner body that covers an interior reservoir of a lubrication tank of a rail lubrication system, the corrosion-resistant liner rigidly fabricated to have vertical walls of rectangular dimensions and angled wall portions of trapezoidal dimensions integrally formed and contoured for conforming engagement with the interior reservoir as the lubrication tank liner is inserted into the interior reservoir, wherein the corrosion-resistant liner is fabricated to define an upper flanged surface at a top of the vertical walls and a lower flanged surface is defined at a bottom of the angled wall portions and wherein both of the upper flanged surface and lower flanged surface include apertures for coupling the upper flanged surface and the lower flanged surface to the interior reservoir of the lubrication tank and said upper flanged surface having a front flange surface, a rear flange surface and a pair of opposed side flange surfaces with an upper liner opening defined between the front flange surface, the rear flange surface and the pair of opposed side flange surfaces.

11. The lubrication tank liner of claim 10, wherein the tank liner is made of metal, plastic or polymer materials.

12. The lubrication tank liner of claim 10, wherein the tank liner has a thickness of 2 millimeters to 0.5 inches.

13. The lubrication tank liner of claim 10, further including a hook-up mechanism that aids in lifting the tank liner.

14. The lubrication tank liner of claim 10, wherein the angled wall portions contain a plurality of grooved ribs that conform the tank liner to a plurality of inner surfaces of the interior reservoir of the lubrication tank.

15. A method of maintaining a lubrication tank of a rail lubricating system, comprising:
providing the lubrication tank including an interior reservoir;
opening the lubrication tank to expose the interior reservoir;
placing a lubrication tank liner within the interior reservoir, the lubrication tank liner rigidly formed to generally match to the interior reservoir as the lubrication tank liner is placed within the interior reservoir and including an upper sidewall portion and a lower outlet portion including a plurality of angled wall portions converging inwardly, the upper sidewall portion defining an upper flanged surface for engaging the interior reservoir, the upper flanged surface including a plurality of apertures, said upper flanged surface having a front flange surface, a rear flange surface and a pair of opposed side flange surfaces with an upper liner opening defined between the front flange surface, the rear flange surface and the pair of opposed side flange surfaces;
securing the lubrication tank liner to the lubrication reservoir with a plurality of fasteners, the fasteners being inserted through the plurality of apertures in the upper flanged surface;
filling the lubrication tank liner through the upper liner opening with lubrication fluid;
pumping lubrication fluid from the lubrication tank to a lubricant applicator for a railway; and
removing the lubrication tank liner for disposal.

16. The method of claim 15, wherein the lubrication tank opens from above for placement of the lubrication liner within the interior reservoir.

17. The method of claim 15, wherein the lubrication tank liner is made of metal, plastic or polymer materials.

18. The method of claim 15, wherein the lubrication tank liner includes a hook-up mechanism that aids in placement and removal of the lubrication tank liner.

19. The method of claim 15, wherein the lower outlet portion defines a lower flanged surface having a plurality of lower apertures and wherein the step of securing the lubrication tank liner to the lubrication reservoir further comprises:
securing the lubrication tank liner to the lubrication reservoir with a plurality of fasteners, the fasteners being inserted through the plurality of lower apertures in the lower flanged surface.

20. A rail lubrication system, comprising:
a lubricant applicator located in proximity to a railway;
a lubricant supply hose fluidly connected to the lubricant applicator; and
a remote lubrication supply including a pump system, control system and a lubrication tank, the lubrication tank having a rigid disposable lubrication tank liner for retaining a lubricant, the rigid disposable lubrication tank liner configured to align with and match an internal reservoir structure defined within a lubrication tank as the rigid disposable lubrication tank liner is inserted into the lubrication tank, the rigid disposable lubrication tank liner further, comprising:
an upper sidewall portion having a plurality of generally vertically disposed walls extending downwardly from an upper flange surface, the vertically disposed walls partially defining a reservoir space for holding rail lubricant, the upper flange surface including a plurality of upper apertures for coupling the upper flange surface to the lubrication tank, said upper flanged surface having a front flange surface, a rear flange surface and a pair of opposed side flange surfaces with an upper liner opening defined between the front flange surface, the rear flange surface and the pair of opposed side flange surfaces;

a lower outlet portion including a plurality of angled wall portions converging inwardly to a lower flange surface to further define the reservoir space, the lower flange surface including a plurality of lower apertures for coupling the lower flange surface to the lubrication tank; and an intermediate edge surface connecting the upper sidewall portion and the lower outlet portion, and wherein the lubricant is pumped from the disposable lubrication tank liner to the lubricant applicator with the pumps system as directed by the control system.

21. The rail lubrication system of claim 20, wherein the lubricant applicator is positioned in proximity to a field face of the railway such that the lubricant is applied to a crown of the railway.

22. The rail lubrication system of claim 20, wherein the lubricant applicator is positioned in proximity to a gauge face of the railway such that the lubricant can be applied at the gauge face.

23. The rail lubrication system of claim 20, wherein the rigid disposable tank liner is removable from the lubrication tank such that a new disposable tank liner can be place into the lubrication tank.

\* \* \* \* \*